March 26, 1968  ATSUSHI SHIROZU  3,374,752
TRANSPLANTER
Filed Aug. 9, 1966  2 Sheets-Sheet 1
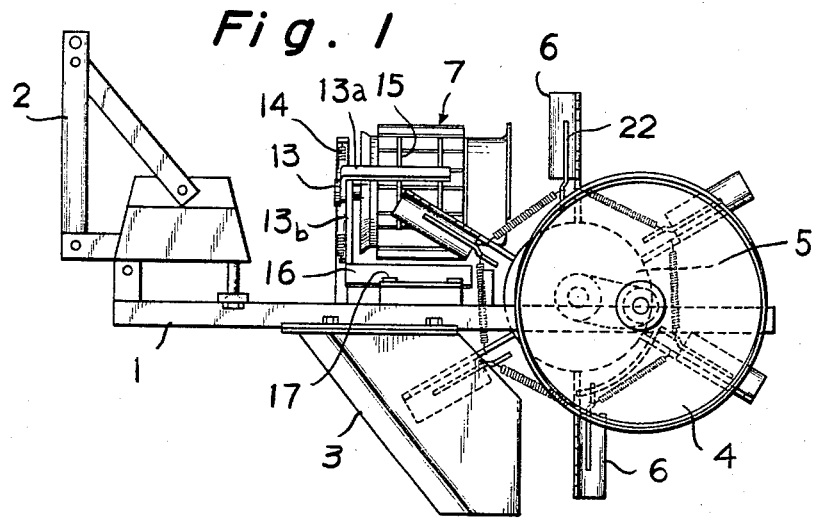
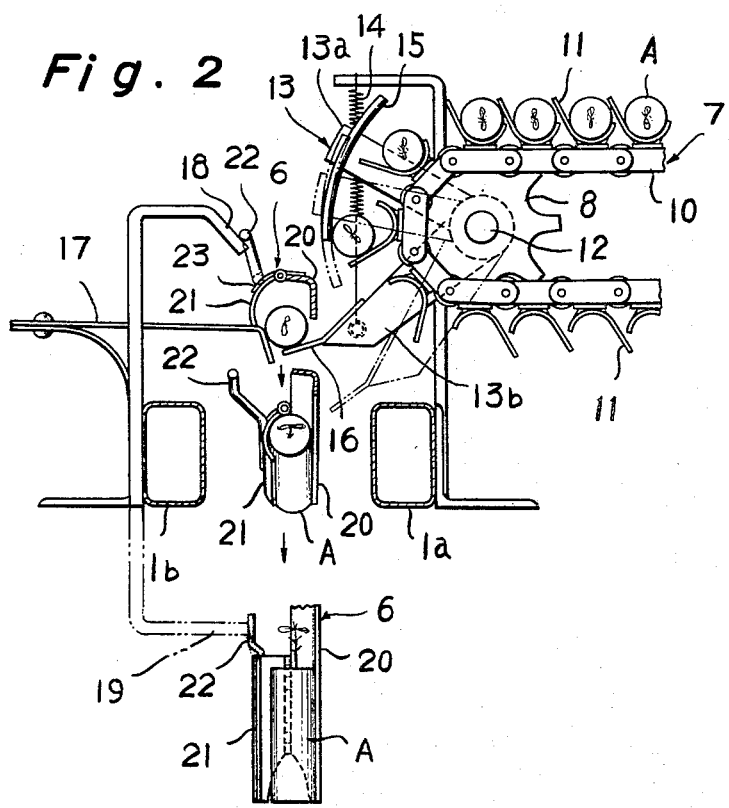

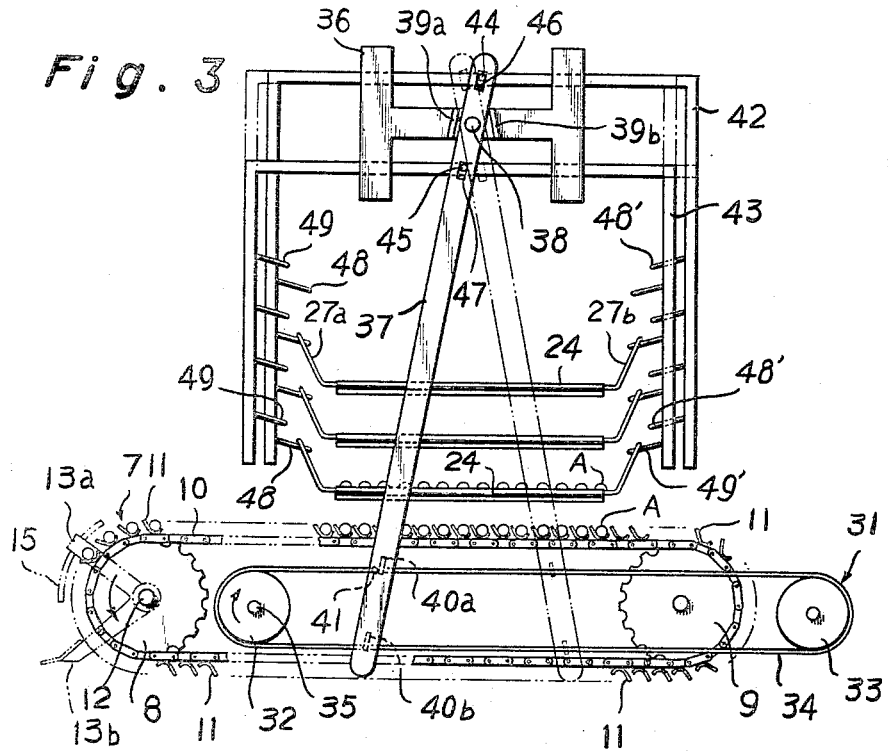
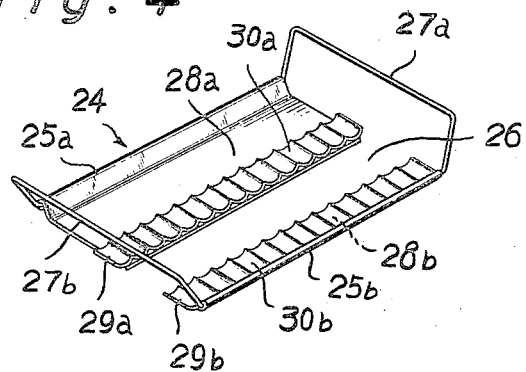

United States Patent Office 3,374,752
Patented Mar. 26, 1968

3,374,752
TRANSPLANTER
Atsushi Shirozu, 644 Chuo, Shiroishi-cho,
Sapporo, Hokkaido, Japan
Filed Aug. 9, 1966, Ser. No. 571,246
Claims priority, application Japan, Mar. 22, 1966,
41/26,235
5 Claims. (Cl. 111—2)

ABSTRACT OF THE DISCLOSURE

A transplanter for paper cylinders containing seeds, said transplanter comprising means adapted to receive said cylinders from a supply means and convey them to a lever pivotally mounted on the frame of the transplanter. At least one cylinder holder is also carried by the frame and is adapted to grasp the cylinders from the lever and convey the cylinders to a planting position with respect to the frame, and means are provided for releasing the cylinders from the cylinder holder upon the former reaching said planting position.

---

This invention relates to a transplanter, and more particularly to a transplanter for plant-setting seedlings of beet, vegetables, tobacco, trees, etc. in a paper cylinder to the fields.

The practice of raising seedlings in paper cylinders and plant-setting them to the fields has recently been popularized. The method, which uses paper cylinders such as those shown and described in the U.S. Patent No. 3,164,507, consists in sowing seeds in soil placed in an elongated bottomless cylinder formed of a material, such as paper or a thin filmy material like paper, which rots in the earth, and plant-setting seedlings thus raised in the cylinders to the fields.

The advantages of this method lie in the facts that the period of growth of plants in the fields can be shortened, the integrating temperature can be increased, plants take root positively, and the labor of thinning can be obviated. The method has hitherto had the disadvantage, however, of requiring a large manpower for plant-setting the paper cylinders, for the operation of plant-setting the paper cylinders has largely been performed manually from the nature of the work.

It is a principal object of this invention to provide an apparatus for positively and efficiently carrying out the operation of plant-setting seedlings in paper cylinders by mechanical power in plant-setting seedlings to the fields.

It is another object of the invention to provide a transplanter which enables to deliver one paper cylinder after another regularly and successively.

It is a further object of the invention to provide a transplanter which enables to intermittently deliver paper cylinders in a controlled manner by means of a paper cylinder holder and a pivoting lever engaged to said holder after the paper cylinders have been conveyed by a moving conveyer, whereby said paper cylinder holder can positively take hold of each paper cylinder.

It is still another object of the invention to provide a transplanter in which a conveyer, paper cylinder holder and pivoting lever are actuated in timed relation with one another, and paper cylinders can positively be delivered at all times without the operation being affected by changes in the speed of the conveyer to thereby carry out a paper cylinder plant-setting operation at high efficiency.

It is still a further object of the invention to provide a transplanter which enables to supply paper cylinders to a moving conveyer positively and efficiently.

Other and further objects are those inherent in the invention herein illustrated, described and claimed, and will become apparent as the description proceeds.

The invention will now be explained with reference to an embodiment illustrated in the accompanying drawings wherein:

FIG. 1 is a side elevation of a transplanter of the invention;

FIG. 2 is a front elevation of a paper cylinder delivery station operatively connected to a paper cylinder conveyer;

FIG. 3 is a front elevation of a paper cylinder supply station operatively connected to the paper cylinder conveyer; and FIG. 4 is a perspective view of a paper cylinder tray.

In FIG. 1, which schematically shows a transplanter, a machine frame 1 has in its front portion a frame 2 for coupling a transplanter to a tractor and the like, and an opener 3 at its lower portion for opening rows or drills when the transplanter is drawn as by the tractor.

At the front portion of the machine frame 1 are fitted a soil covering wheel 4 and a driving wheel 5 coupled to said soil covering wheel 4, and a paper cylinder holder 6 comprising a plurality of paper cylinder holder members arranged radially about said driving wheel 5 and having an opening facing the direction of movement of the driving wheel 5, secured to the driving wheel 5 so that they may rotate as a unit.

At an upper portion of the machine frame 1 is fitted a paper cylinder conveyer 7 which is coupled to the driving wheel 5 and operates in conjunction therewith.

The paper cylinder conveyer 7 comprises, as shown in FIGS. 2 and 3, an endless belt 10, such as a chain, trained around front and rear sprocket wheels 8 and 9 and having a multitude of partition walls 11 positioned at regular intervals on the outer circumferential surface thereof. To a driving shaft 12 of the front sprocket wheel 8 is loosely fitted the bent portion of an L-shaped pivoting lever 13, a lower leg 13b of which is maintained at a predetermined position by the biasing force of a spring 14 coupled to one machine frame portion 1a.

An upper arm 13a of the pivoting lever 13 has a paper cylinder retaining plate 15 secured to its front end and positioned above a paper cylinder releasing end of the conveyer 7. The lower arm 13b of the pivoting lever 13 has a paper cylinder guide plate 16 secured to its front end and positioned obliquely below said paper cylinder releasing end of the conveyer 7. A paper cylinder retaining spring plate 17 secured to the other machine frame member 1b, has a front end positioned adjacent a front end of said paper cylinder guide plate 16. Projections 18 and 19 of the machine frame member 1b are positioned above and below said paper cylinder retaining spring plate 17 respectively.

Aforementioned paper cylinder holder 6 rotates downwardly between the two machine frame members 1a and 1b as shown in FIG. 2, while it is brought into and released from contact with the projections 18 and 19 and pushes the paper cylinder guide plate 16 secured to the lower arm 13b of the pivoting lever 13 during its movement.

Each paper cylinder holder member 6 comprises a frame plate 20 which is substantially L-shaped in longitudinal section, and an opening and closing plate 21, substantially arcuate in longitudinal section, which is pivotally coupled at its upper end to an end portion of an upper member of said frame plate 20. Said two plates 20 and 21 are formed substantially in an inverted U shape, with a lower end being opened. A projecting member 22 is affixed to an upper part of the opening and closing plate 21, and a spring 23 is fitted on a portion connecting the frame plate 20 with the opening and closing plate 21 so that a lower end of the opening and closing plate 21 may be normally urged toward the frame plate 20 to thereby close aforementioned lower end.

The transplanter having the constructional arrangement as aforementioned is operated, with paper cylinders A being positioned in parallel with one another between the partition walls 11 on the endless belt 10 of the conveyer 7. As the transplanter is operated, the soil covering wheel 4 rotates, thereby driving the conveyer 7 through the driving wheel 5 coupled to the soil covering wheel 4, driving shaft 12 and sprocket wheel 8. As the conveyer 7 is moved, the paper cylinders A are transferred downwardly and the first paper cylinder A is held between the paper cylinder guide plate 16 secured to the lower arm 13b of the pivoting lever 13 and the paper cylinder retaining spring plate 17. At the same time, the paper cylinder holder 6 secured to the driving wheel 5 moves downwardly between the two machine frame members 1a and 1b. As the paper cylinder holder 6 moves downwardly, the projecting member 22 comes into contact with the upper projection 18 provided on the machine frame member 1b to thereby move the opening and closing member 21 in pivotal motion against the biasing force of the spring 23. The paper cylinder holder member 6, which has had its lower portion opened in this way, covers from above the first paper cylinder A held between the paper cylinder guide plate 16 and the paper cylinder retaining spring plate 17. When the projecting member 22 is released from engagement with the upper projection 18, the opening and closing plate 21 is moved in pivotal motion by the force of spring 23 to return to its original position. Thus, the paper cylinder is held between the opening and closing plate 21 and the frame plate 20.

Further downward movement of the paper cylinder holder member 6 holding the first paper cylinder A brings a lower end of the frame plate 20 into contact with the paper cylinder guide plate 16 to push the same downwardly, with the result that the pivoting lever 13 is moved in pivotal motion against the biasing force of the spring 14. This causes the paper cylinder retaining member 15 secured to the upper arm 13a to move downwardly, thereby preventing the next following paper cylinder A on the conveyer 7 which is coupled to the paper cylinder holder 6, from dropping onto the paper cylinder guide plate 16.

Further downward movement of the paper cylinder holder member 6 holding the first paper cylinder A releases the holder member 6 from engagement with the guide plate 16, the pivoting lever 13 being restored to its original position by the action of the spring 14. At the same time, the retaining plate 15 is also restored to its original position, so that the next following paper cylinder A disposed at the front end of the conveyer 7 is released and drops onto the guide plate 16 to be positioned between the guide plate 16 and the retaining spring plate 17 ready to be covered by the next following holder member 6.

On the other hand, when the holder member 6 continuing its downward movement moves to a position below the transplanter and above a row opened by the opener 3, the projecting member 22 comes into contact with the lower projection 19 of the machine frame member 1b and opens the lower portion of the holder member 6 in the same manner as aforementioned, whereby the first paper cylinder A drops into the row. The soil covering wheel 4 that follows in the wake of the step covers the paper cylinder with earth thereby completing the plant-setting of seedlings in one paper cylinder.

Now an automatic paper cylinder supply apparatus for supplying paper cylinders A to the conveyer 7 will now be explained.

A paper cylinder tray 24 shown in FIG. 4 is used for supplying the paper cylinders A to the conveyer 7. The paper cylinder tray 24 is formed to provide side frames 25a and 25b disposed in parallel with each other on the opposite sides of the tray and spaced apart from each other by a gap 26 slightly larger in width than the conveyer 7. Connecting frames 27a and 27b substantially in the form of an inverted letter U and opened in the lower end are fitted on the upper end portions of the two side frames 25a and 25b. Fitted on the sides of the two side frames 25a and 25b positioned against each other are supporting frames 28a and 28b, positioned in side-by-side relation with each other, on which paper cylinder supporting members 29a and 29b are fitted respectively, one paper cylinder supporting member 29a being disposed on an inner front end portion of one supporting frame 28a and the other paper cylinder supporting member 29b being positioned on an upper side of the other supporting frame 28b. The paper cylinder supporting frames 29a and 29b are formed to provide a multitude of substantially arcuate grooves 30a and 30b arranged in a wavy configuration, which correspond in form to the cylindrical surface of the paper cylinder A. The grooves have a pitch which is identical with the pitch of the partition walls 11 of the conveyer 7, and the gap 26 between the two paper cylinder supporting members 29a and 29b is larger in width than the conveyer 7.

The paper cylinder tray 24 having the paper cylinders A disposed in parallel with one another in the grooves 30a and 30b on the supporting members 29a and 29b is placed on the conveyer 7 in such a manner that the connecting frames 27a and 27b straddle the conveyer 7 at right angles thereto, thereby enabling to supply the paper cylinders A to the conveyer. In the present invention, an apparatus as shown in FIG. 3 is used for automatically moving the paper cylinder tray 24 to a position on the paper cylinder conveyer 7 and at the same time for removing the empty tray 24 from said position on the conveyer 7.

As shown in FIG. 3, paper cylinder tray conveyers 31 are fitted on both sides of the paper cylinder conveyer 7 on a level lower than the level of the conveyer 7. The conveyers 31 move in the direction opposite to the direction of movement of the conveyer 7. The conveyers 31 comprise an endless belt 34 trained around front and rear pulleys 32 and 33. The pulley 32, which has a shaft 35 associated with the conveyer 7, is rotated at a speed determined by the number of the paper cylinders A in the tray 24. Normally, the conveyers 31 move at a speed such that they come full revolution when the conveyer 7 has finished delivering a trayfull of the paper cylinders A.

A bearing member 36 is secured to the machine frame at a position above the conveyers 31. A swinging bar 37 is carried at its upper portion by a pin 38 fitted to the bearing member 36. Stoppers 39a and 39b are fitted on lateral sides of the bearing member 36 in the front and rear of the swinging bar 37 such that they are inclined in the opposite directions at a predetermined angle whereby the swinging bar 37 pivoted at the pin 38 for swinging motion is stopped by the stoppers 39a and 39b. The swinging bar 37 has upper and lower projections 40a and 40b formed in its lower portion on the side face of the conveyors 31, which are adapted to engage a projection 41 formed on one side of the conveyors 31. When one of either one of the stoppers 39a and 39b, the projection 41 the swinging bar 37 swings to right or left as the conveyors 31 move. When, however, the swinging bar 37 engages either one of the stoppers 39a and 39b, the projection 41 is released from engagement with the projection 40a or 40b.

Two brackets 42 and 43, each formed substantially in the shape of an inverted letter U, are positioned in side-by side relation with each other and fitted at their top members by the bearing member 36. Formed in the center on one side of the top members of the brackets 42 and 43, respectively, are projections 44 and 45 which are received freely in holes 46 and 47, respectively, formed in the upper portion of the swinging bar 37 above and below the pin 38. It will be understood that the brackets 42 and 43 move in shifting motion as the swinging bar swings to and fro.

Each of the brackets 42 and 43 has on the inner sides of their vertical members a predetermined number of projections 48, 48' and 49 and 49', respectively, which are slightly inclined downwardly. The projections 48 and 48' formed on the opposing vertical members of the bracket 42 are disposed on levels differing from each other by half a pitch between the projections. The projections 49 and 49' formed on the bracket 43 are also positioned on levels differing from each other. The lowermost projection 48 on one vertical member of the bracket 42 and the lowermost projection 49' on the other vertical member of the bracket 43 are on the same level. The lowermost projection 49 on one vertical member of the bracket 43 and the lowermost projection 48' on the other vertical member of the bracket 42 are on the same level.

In operation, the connecting frames 27a and 27b of the tray 24 are hung on the projections 48 and 49' of the brackets 42 and 43, respectively, which are on the same level. As the conveyors 31 move, the projection 41 on the conveyors 31 engages the upper projection 40a of the swinging bar 37, which moves in swinging motion to the right as seen in FIG. 3 to a position shown in dotted line. The swinging motion of the bar 37 causes one bracket 42 to move to the left and the other bracket 43 to move to the right as seen in FIG. 3, whereby the connecting frames 27a and 27b of the tray 24 are released from engagement with the projections 48 and 49' and drop downwardly. As soon as the tray 24 drops onto the conveyor 7, the paper cylinders A on the tray fill the spaces between the partition walls 11 on the conveyor 7. The tray 24 thus emptied of its contents is transferred by the conveyors 31 and automatically removed.

Before the connecting frames 27a and 27b of the tray 24 are released from engagement with the projections 48 and 49' by the shifting motion of the brackets 42 and 43, the projections 49 and 48' move inwardly so that the connecting frames 27a and 27b of the second tray 24 on the upper level, without dropping onto the conveyor 7, may engage the projections 49 and 48' that have moved to the lowermost level.

Further movement of the conveyers 31 coupled to the conveyer 7 causes the projection 41 to engage the projection 40b and move the swinging bar 37 to the left in FIG. 3. The movement of the swinging bar 37 to the left causes the bracket 42 and bracket 43 to move in shifting motion to right and left, respectively, as seen in FIG. 3. Then the lowermost tray 24 drops downwardly onto the conveyer 7 in the manner described above, with the second tray 24 on the upper level being shifted to a position on the lowermost projections 48 and 49' ready for delivering the next supply of paper cylinders.

From the foregoing description, it will be appreciated that this invention enables to automatically supply paper cylinders A successively from the tray 24 to the conveyer 7, with the trays emptied of their contents being automatically removed.

*Example 1*

Two transplanters of which one is shown in FIG. 1 were coupled to a tool bar as two-row transplanters so as to operate freely each other (2015 millimeters in total length and 1800 millimeters in total width), said tool bar being mounted directly with a track, and drawn by the tractor of 30 H.P. in order to set seedlings of beet raised in paper cylinders of 19 millimeters in diameter and 130 millimeters in length.

The spacing between row-spacing was 600 millimeters, the spacing between the seedlings planted was 250 millimeters, and the speed of the tractor was 0.85 meter per second. In an operation performed under these conditions and continued for 8 hours, seedlings were set on 2.5 hectares of field.

Investigation after operation showed that all the seedlings had been set in the normal way, and that the plants grew smoothly after plant-setting.

*Example 2*

Two transplanters of which one is shown in FIG. 1 were coupled to a tool bar as two-row transplanters so as to operate freely each other (2015 millimeters in total length and 1800 millimeters in total width), said tool bar being mounted directly with a track, and drawn by the tractor of 30 H.P. in order to set lettuce raised in paper cylinders of 30 milimeters in diameter and 60 millimeters in length.

The spacing between the row-spacing was 500 millimeters, the spacing between the seedlings planted was 250 millimeters, and the speed of the tractor was 0.85 meter per second. In an operation performed under these conditions and continued for 8 hours, seedlings were set on 2 hectares of field.

Investigation after operation showed that all the seedlings had been set in the normal manner, and that the seedlings grew smoothly after plant-setting.

The present invention is not limited to the embodiment described above, of course it should be understood that various modifications may be made without departing from the scope of the present invention.

What I claim is:

1. A transplanter for paper cylinders containing seeds, said transplanter comprising a frame, supply means for said cylinders carried by said frame, conveying means for said cylinders carried by said frame and adapted to receive said cylinders from said supply means, a lever pivotally mounted on said frame at one end of said conveying means and adapted to selectively receive said cylinders from said conveying means, at least one cylinder holder carried by said frame and adapted to grasp said cylinders from said lever and convey said cylinders to a planting position with respect to said frame, and means carried by said frame for releasing said cylinders from said cylinder holder upon said cylinders reaching said planting position.

2. The transplanter of claim 1 further comprising furrowing means carried by said frame, a soil covering wheel rotatably mounted on said frame, and a driving wheel coupled to said soil covering wheel.

3. The transplanter of claim 2 wherein said cylinder holder comprises a plurality of cylinder holder members arranged radially about said driving wheel and each having an opening facing the direction of movement of said driving wheel.

4. The transplanter of claim 1 wherein said supply means comprises at least one cylinder tray for containing a plurality of cylinders, and an automatic feeding apparatus for automatically delivering one cylinder tray after another successively to said conveying means.

5. A transplanter as described in claim 4 further comprising a cylinder tray conveyor carried by said frame for moving each cylinder tray in the direction opposite to the direction of movement of said conveying means after each tray has been emptied of said cylinders.

References Cited

UNITED STATES PATENTS

| 2,609,767 | 9/1952 | Tapp et al. | 111—3 |
| 3,002,473 | 10/1961 | Morine | 111—2 |
| 3,078,816 | 2/1963 | Poll | 111—2 |
| 3,221,681 | 12/1965 | Snyder et al. | 111—3 |
| 3,246,615 | 4/1966 | Poll | 111—2 |

FOREIGN PATENTS

| 637,608 | 2/1928 | France. |
| 1,186,862 | 3/1959 | France. |
| 79,371 | 10/1962 | France. |

ROBERT E. BAGWILL, *Primary Examiner.*